April 25, 1933.  E. K. BOTTLE  1,905,893
MANIFOLDING BOOK
Filed Sept. 30, 1927  4 Sheets-Sheet 3
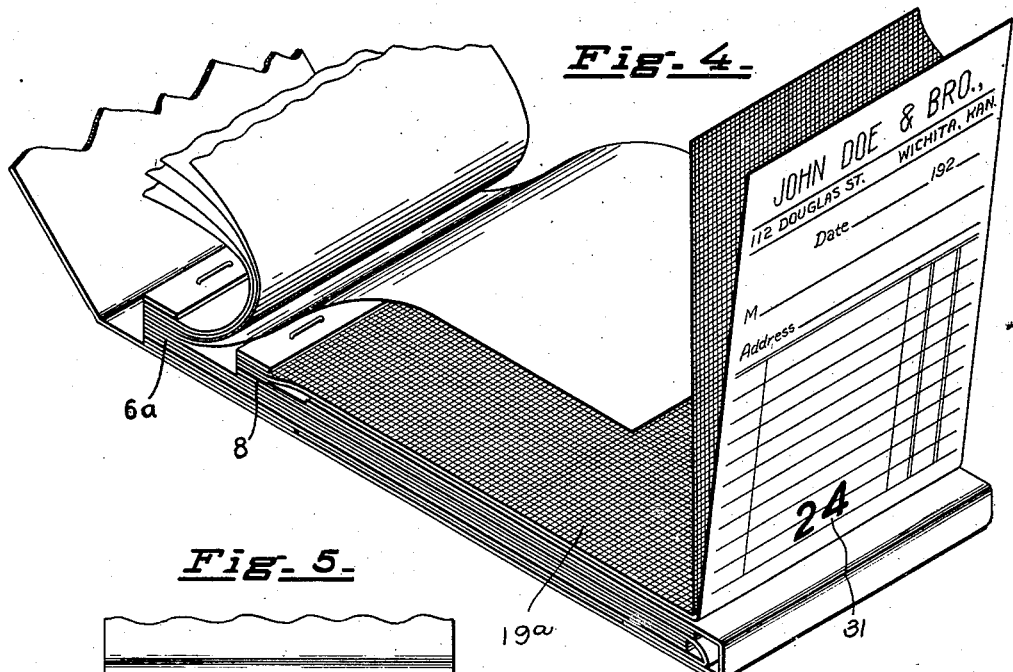
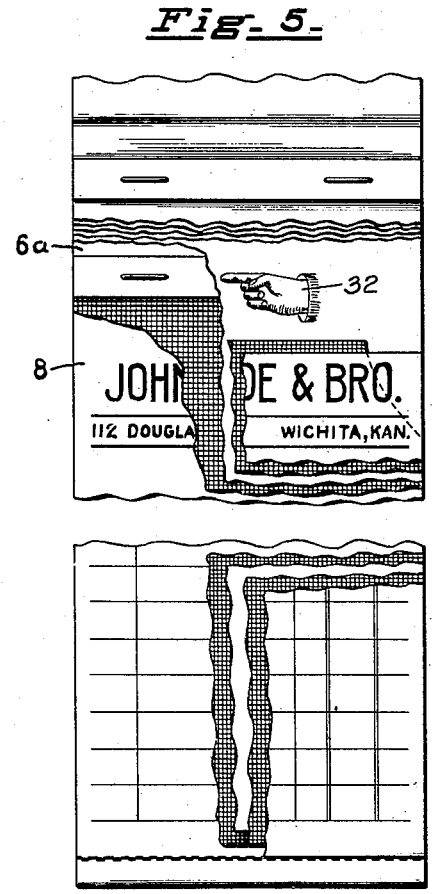
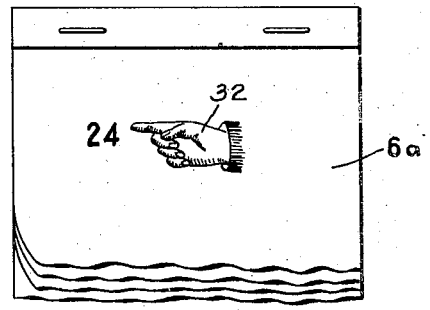
INVENTOR.
Edward K. Bottle
BY
ATTORNEYS.

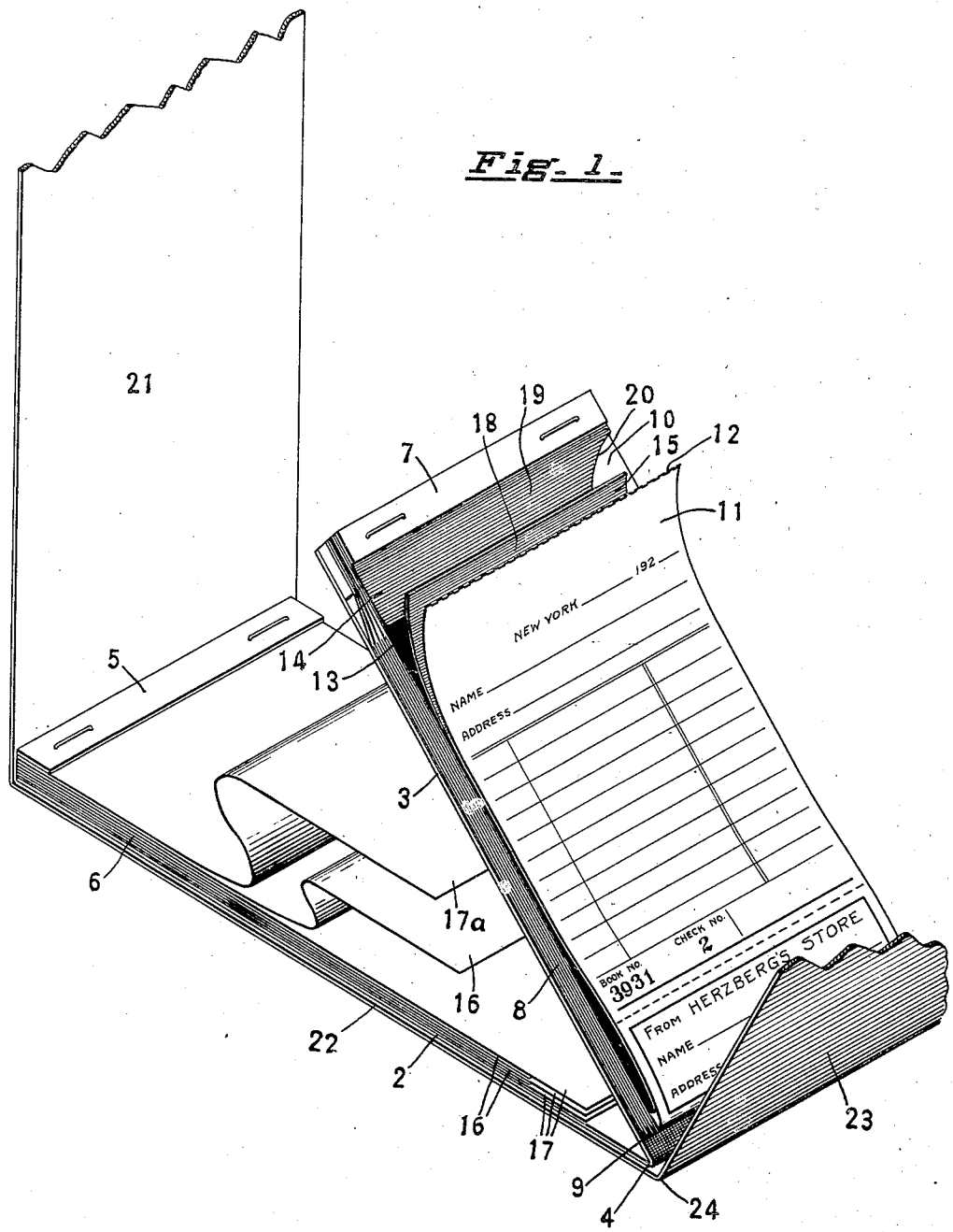

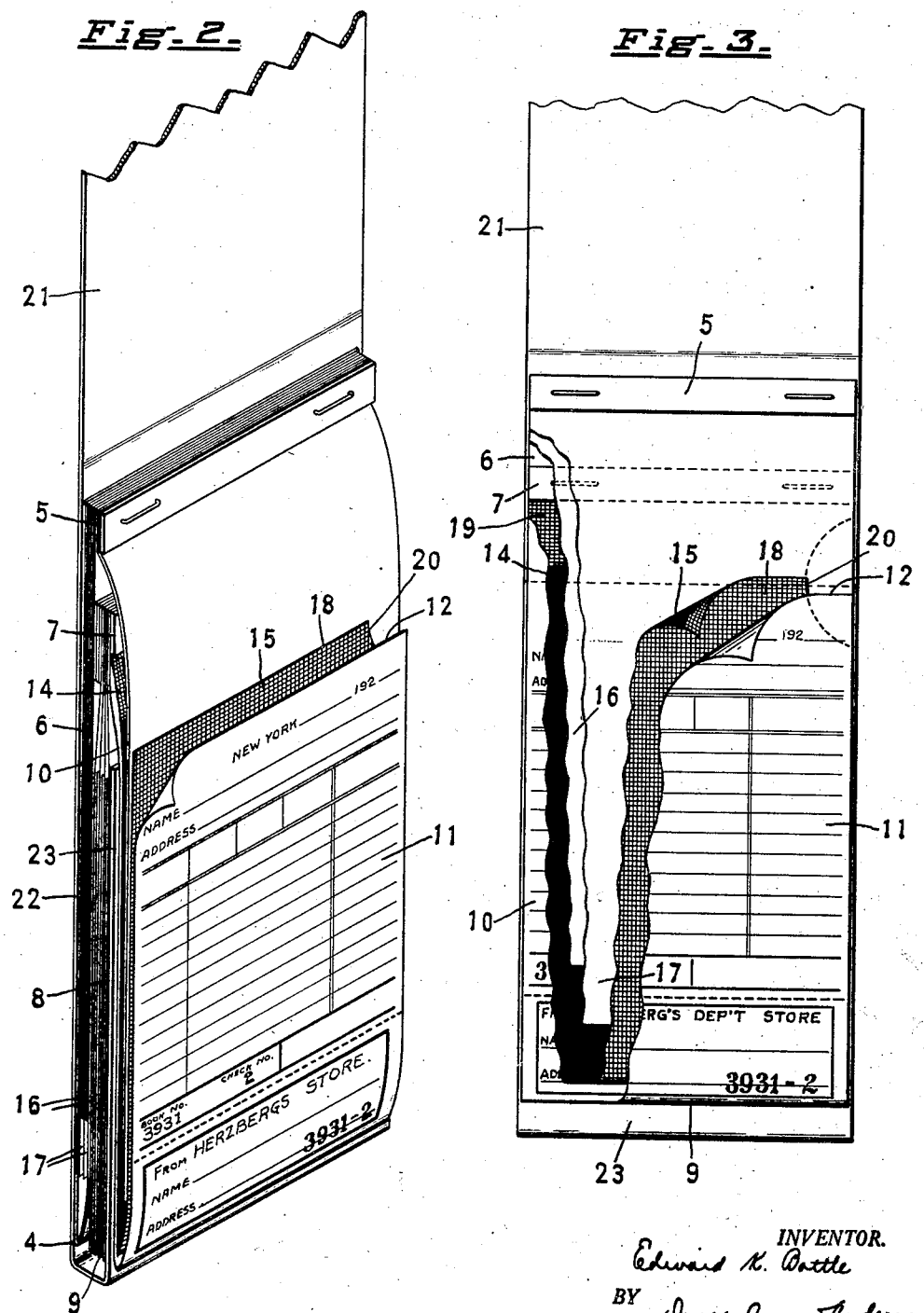

April 25, 1933.  E. K. BOTTLE  1,905,893
MANIFOLDING BOOK
Filed Sept. 30, 1927  4 Sheets-Sheet 4
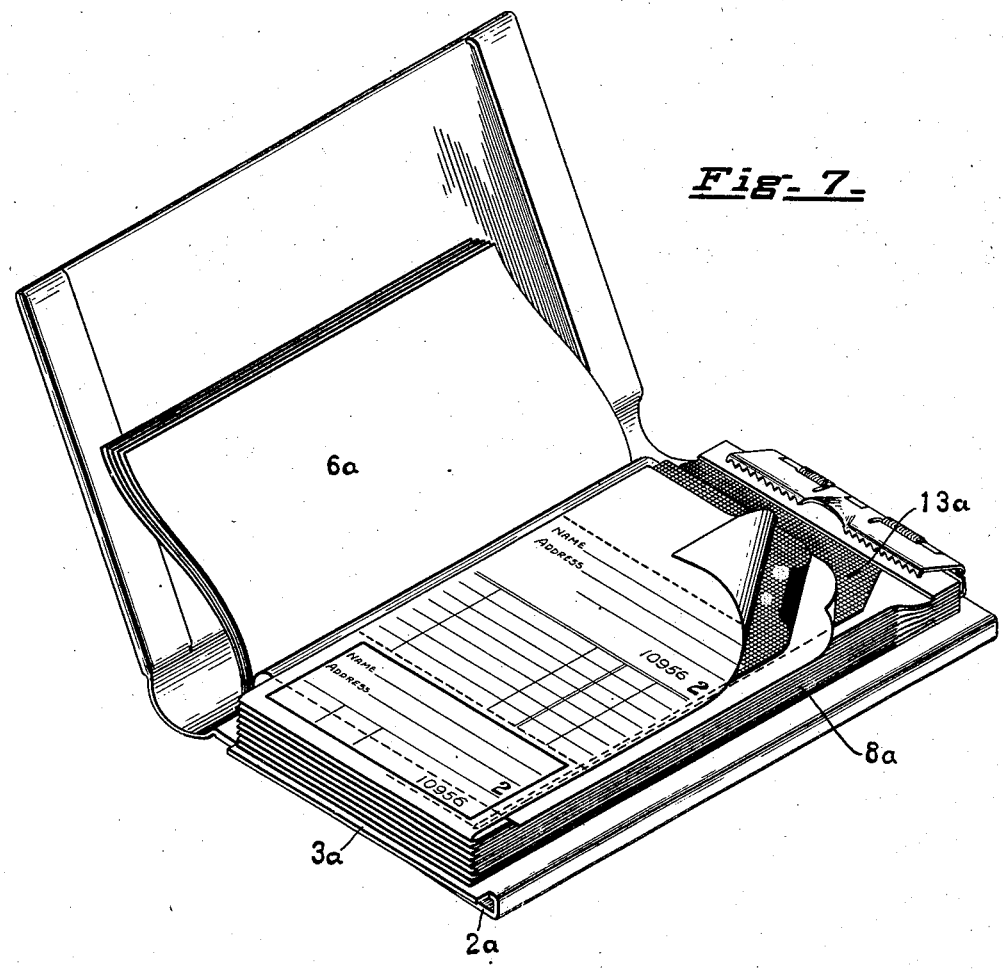
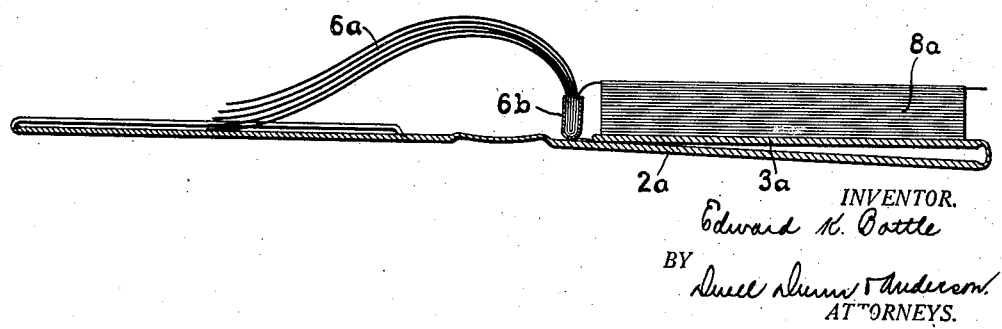

Patented Apr. 25, 1933

1,905,893

UNITED STATES PATENT OFFICE

EDWARD KIRBY BOTTLE, OF ELMIRA, NEW YORK, ASSIGNOR TO AMERICAN SALES BOOK COMPANY, LIMITED, OF TORONTO, ONTARIO, CANADA, A CORPORATION OF ONTARIO

MANIFOLDING BOOK

Application filed September 30, 1927. Serial No. 223,080.

This invention relates to sales books.

It is an object of the invention to provide a new and improved sales book in accordance with which a manifold record may be made in quadruplicate by a simple construction.

It is a further object to provide a book in which two copies of each record set may be retained as a permanent record in a pad, but in which one of those copies of each set may be removed at will in an easy and expeditious manner. A further object is to provide for making four records at one inscription, each record being readable direct instead of through the record sheet.

For a fuller understanding of the nature and objects of the invention reference should be had to the following detailed description taken in connection with the accompanying drawings, in which:

Fig. 1 is a perspective view of a book made in accordance with this invention adapted for the making of a quadruplicate record.

Fig. 2 is a similar view of the book with the leaves assembled ready for inscription.

Fig. 3 is a plan view, part of the leaves being broken away.

Fig. 4 is a perspective view of a modification intended to make triplicate copy.

Fig. 5 is a plan view of the modification shown in Fig. 4 with the parts assembled ready for inscription.

Fig. 6 is a view showing the identification indicia intended to insure that the corresponding sheets from the different pads are assembled in proper relation.

Fig. 7 is another modification showing the embodiment of the invention in a book opening from the side.

Fig. 8 is an end view of the embodiment of the invention shown in Fig. 7.

In the embodiment illustrated in Figs. 1, 2 and 3, there is provided a backing comprising two members 2 and 3 which may be of comparatively stiff manila board hinged together as at 4. One of these members, as for example, the member 2, is longer than the other, and to it at its free end is attached the stub portion 5 of a supplemental pad 6 of record leaves. The other member 3 has attached to its outer end the stub portion 7 of a main pad 8. In this manner it will be clear that by reason of the fact that the member 2 is longer than the member 3 the leaves of the pad 6 may be caused to underlie or overlie the pad 8. The main pad 8 comprises, in general, a plurality of sheets, each folded back upon itself, as shown at 9, to form superposed sets of two record leaves 10 and 11, each of the latter having a free end as shown at 12 which lies spaced from the stub 7. A manifolding or transfer sheet 13 also bound within the stub 7 is folded similarly to the record sheets to provide an underlying sheet or leaf 14 and an overlying sheet or leaf 15.

The pad 6 comprises a plurality of superposed leaves. It is intended that a set of the sheets 10 and 11 of pad 8 shall be assembled with two leaves from the pad 6 to form a record set, these two leaves of one set being designated as 16 and 17. The bottom leaf of each set of two leaves of pad 6 is a translucent tissue leaf, and these leaves are foldable into and out of position between the leaves of the top set of the main pad 8.

The transfer sheet 13 is provided with carbon upon the lower sides of both leaves 14 and 15 and upon the upper side of the under leaf 14, and the upper leaf of the transfer sheet is longer than the corresponding leaf of the record sheets, to provide an extension 18 which, when the transfer sheet lies between the leaves of any set of record sheets, will extend out from beneath the adjacent end of the superposed record sheet in position to be readily grasped by the fingers. This extension is free from carbon on both sides in order that it may be clean for being readily handled without smutting. Similarly that portion of the upper surface of the under manifolding sheet 14 is likewise free from carbon opposite the extension 18 as shown at 19 lying adjacent to the clean areas or faces of the extension 18 when the manifolding book is set for inscription. As shown, the clean areas or faces of the extension 18 may overlap slightly the clean area 19 when the upper and lower carbon leaves are folded in operative position, and the clean area 19 may be continued beyond the extremity of the extension 18 of carbon leaf 15. By means of this arrangement the leaves may be conveniently manipulated without soiling the fingers. In order to grasp the free end of leaf 15, the finger may press or rub slightly upon the clean extension 18 and against the clean surface 19, thus entirely avoiding contact with any of the carbonized surfaces.

Both of the leaves 14 and 15 of the carbon sheet may be cut out as shown at 20 to enable the corner of the free upper end of the record sheet 11 to be readily grasped when the carbon leaves lie on the top of the pad. The free corner of the leaf 11 is thus exposed through the notches 20 so as to be readily accessible therethrough.

It is preferable that the leaves 17 of the pad 6 shall be longer than the alternate leaves 16, to facilitate the removal of the leaves 17 when the opportune time for such removal has arrived, without disturbing the sheets 16.

In order to facilitate clear inscription a writing plate or tablet is attached to the back 1. To this end a member 21, which may be of manila board, has one extension 22 extending up below the back 1 and having a second extension 23 comprising the writing plate 23 hinged to the first, as shown at 24. By this construction the plate 23 may be inserted behind any record leaf desired.

As will be seen from Fig. 3, it is preferred that the leaves from the first pad 8 shall not extend clear to the bottom of the leaves of the second pad 6. This permits the insertion of data at this point on leaves of the second pad, which is not desired shall appear upon the leaves of the first pad.

In preparing the book for inscription it will be understood that the upper right-hand corner of the leaf 11 may be grasped through the thumb hole 20 and pulled out from beneath the carbon. Thereupon the upper clean extension 18 of the upper carbon sheet 15 may be lifted to permit the insertion therebetween of a set of two sheets 16 and 17 from the pad 6. During this operation the writing plate 23 may be inserted or will automatically move to operative position beneath the set to be inscribed, whereupon when the leaves are allowed to fall upon each other the set is ready for inscription.

In the form of invention illustrated in Fig. 4 a triplicate record only is required, so that the leaves of the pad 6a will correspond in number to the number of sets within the pad 8, one leaf only being assembled between the sheets of the pad 8. In this embodiment the upper surface of the transfer sheet 19a need not be carbonized.

The form of the invention embodied in Figs. 7 and 8 comprises a side opening book in which the backing members 2a and 3a are hinged at the side, while the auxiliary pad 6a is supported by a clamp 6b upon the side of lower backing member 2a in position to overlie the leaves of a pad 8a supported by the upper member 3a. The manifolding sheet 13a is bound within the pad 8a similar in this respect to the construction of the previous embodiment. The manipulation of this modification is similar to that of the prior form.

With all of these forms, the leaves of the two pads are arranged to be assembled in sets for inscription and it is desirable to insure that each leaf in turn is assembled with its proper set. It is desirable, therefore, to provide means to prevent confusion. To this end each sheet of each set bears a serial number, and these are preferably so arranged that when the pads are assembled for inscription, a serial number 30 on the sheets from the pad 6, or 6a as well as a serial number 31 on the sheets from the pad 8, are open to direct inspection, and there is also provided near the numeral upon the sheets of the pad 6 or 6a an indicator 32.

Since certain changes may be made in the above article, and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. A manifolding book comprising a main and a supplemental pad, said main pad having relatively superposed sets of folded record leaves, means supporting said pads in relation for placing the leaves of the supplemental pad into and out of position between the leaves of the uppermost set of the main pad, and a transfer sheet mounted for interposition between the leaves of succeeding sets of the main pad folded to provide upper and lower transfer sheets, the upper and lower faces of the bottom transfer leaf having carbon thereon, and the lower face of the upper transfer leaf having carbon thereon, said supplemental pad having a set of two relatively superposed leaves for each set of folded sheets of the main pad, the bottom leaf of each set of the supplemental pad being translucent, the free end of the upper transfer leaf having clean upper and lower faces, the lower transfer leaf having, on its upper face a clean area positioned adjacent said free clean end of the upper transfer leaf and having a portion extending beyond said free end when the book is set for inscription.

2. A manifolding book comprising a main and a supplemental pad, said main pad having relatively superposed sets of folded record leaves, means supporting said pads in relation for placing the leaves of the supplemental pad into and out of position between the leaves of the uppermost set of the main pad, and a transfer sheet mounted for interposition between the leaves of succeeding sets of the main pad folded to provide upper and lower transfer leaves, the upper and lower faces of the bottom transfer leaf having carbon thereon, and the lower face of the upper transfer leaf having carbon thereon, said supplemental pad having a set of two relatively superposed leaves for each set of folded leaves of the main pad, the bottom leaf of each set of the supplemental pad being translucent, the free end of the upper transfer leaf having clean upper and lower faces extending outside the adjacent end of the upper record leaf, the lower transfer leaf having, on its upper face, a clean area positioned adjacent to an overlapping said free clean end of the upper transfer leaf and having a portion extending beyond said free end when the transfer leaves are folded one on another.

3. A manifolding book including main and supplemental pads of record leaves, said main pad having relatively superposed sets of record leaves, one of which in each set is folded on another, supporting means supporting said pads in relation for placing the leaves of one pad in superposed manifolding relation with those of the other pad, and a transfer sheet mounted in the book in position for interposition between the leaves of succeeding sets of the main pad and being folded to provide upper and lower transfer leaves, the upper of which when in operative position has a free end projecting beyond the adjacent edge of the overlying record leaf, both of said transfer leaves having transfer surfaces positioned for transferring inscriptions to the record leaves, the free projecting end of said upper transfer leaf being clean and free of transfer material at both upper and lower surfaces thereof, and the next leaf underlying said projecting end, when the leaves of the pads are in superposed manifolding relation with each other, having also a surface area clean and free of transfer material and positioned contiguous to said free projecting end of the upper transfer leaf.

4. A manifolding book including main and supplemental pads of record leaves, said main pad having relatively superposed sets of record leaves, one of which in each set is folded on another, supporting means supporting said pads in relation for placing the leaves of one pad in superposed manifolding relation with those of the other pad, and a transfer sheet mounted in the book in position for interposition between the leaves of succeeding sets of the main pad and being folded to provide upper and lower transfer leaves, the upper of which when in operative position has a free end projecting beyond the adjacent edge of the overlying record leaf, both of said transfer leaves having transfer surfaces positioned for transferring inscriptions to the record leaves, the free projecting end of said upper transfer leaf being clean and free of transfer material at both upper and lower surfaces thereof and said lower transfer leaf having an upwardly disposed surface area clean and free of transfer material positioned contiguous to said free projecting end of the upper transfer leaf when the latter lies in contact with the lower transfer leaf.

In testimony whereof I affix my signature.

EDWARD KIRBY BOTTLE.